United States Patent [19]

King

[11] 3,781,875

[45] Dec. 25, 1973

[54] MECHANICAL ARRANGEMENT OF THE TELEVISION GENERATOR

[75] Inventor: William L. King, Wheaton, Md.

[73] Assignee: Datavision, Inc., Rockville, Md.

[22] Filed: Oct. 4, 1971

[21] Appl. No.: 186,262

[52] U.S. Cl. ..... 340/365 R, 174/52 R, 317/101 DH, 340/324 AD

[51] Int. Cl. .............................................. G08b 5/36

[58] Field of Search ................. 340/365 R, 324 AD; 317/101 DH, 112; 174/52 R; D26/5 C

[56] References Cited

UNITED STATES PATENTS 3,413,610 11/1968 Botjer et al. ................. 340/324 AD 3,588,838 6/1971 Felcheck......................... 340/172.5

*Primary Examiner*—David L. Trafton

*Attorney*—Firm, Aitken, Dunner & Ziems

[57] ABSTRACT

A television character generator is provided with a housing and keyboard arrangement in which the video signal generating circuitry is located directly beneath the keyboard. The keyboard, which is a mercury switch operated encoding keyboard, and video signal generating circuitry are mounted on a folding frame which can be unfolded to provide ready access to the keyboard and circuitry.

10 Claims, 7 Drawing Figures

INVENTOR

WILLIAM L. KING

BY Lane, Aitken, Dunner & Ziems

ATTORNEYS

INVENTOR

WILLIAM L. KING

BY Lane, Aitken, Dunner & Ziems

ATTORNEYS

INVENTOR
WILLIAM L. KING

BY Lane, Aitken, Dunner & Ziems
ATTORNEYS

MECHANICAL ARRANGEMENT OF THE TELEVISION GENERATOR

This invention relates to a television character generator and more particularly to such a generator with an improved housing and mounting structure.

A television character generator in response to received coded signals produced by keyboard and representing alphanumeric characters generates a video signal that will reproduce the characters on the screen of a television monitor or receiver. Television character generators are used to provide a visual display of data sent to and received from computers. They are also used as a means to providing a visual display of alphanumeric data in combination with television transmission and as a means for providing visual display of alphanumeric data at remote locations.

SUMMARY OF THE INVENTION

This invention provides a unique housing and keyboard arrangement which makes the television character generator of the present invention much more compact than the television character generators of the prior art and also facilitates access to the circuitry which generates the video signals in response to the coded signals generated by the keyboard. The keyboard of the television character generator is of the type which generates signals by actuating mercury switches, which in turn, generate the coded signals. The circuitry which generates the video signals in response to the coded signals generated by the keyboard, is located directly beneath the keyboard. The keyboard and the video signal generating circuitry are mounted on a folded frame which unfolds to provide easy access to both the circuitry and to the coding and switching components of the keyboard. The choice of the keyboard, the location of the video signal generating circuitry directly beneath the keyboard and the folding frame structure results in a compact portable unit with a low silhouette greatly superior to the bulky arrangements of the prior art. Because of the folding frame on which the keyboard and circuitry are mounted, both the circuitry and the keyboard are readily accessible for maintenance even though the circuitry is compactly mounted directly beneath the keyboard.

DESCRIPTION OF THE PREFERRED EMBODIMENTS

Figure 1:
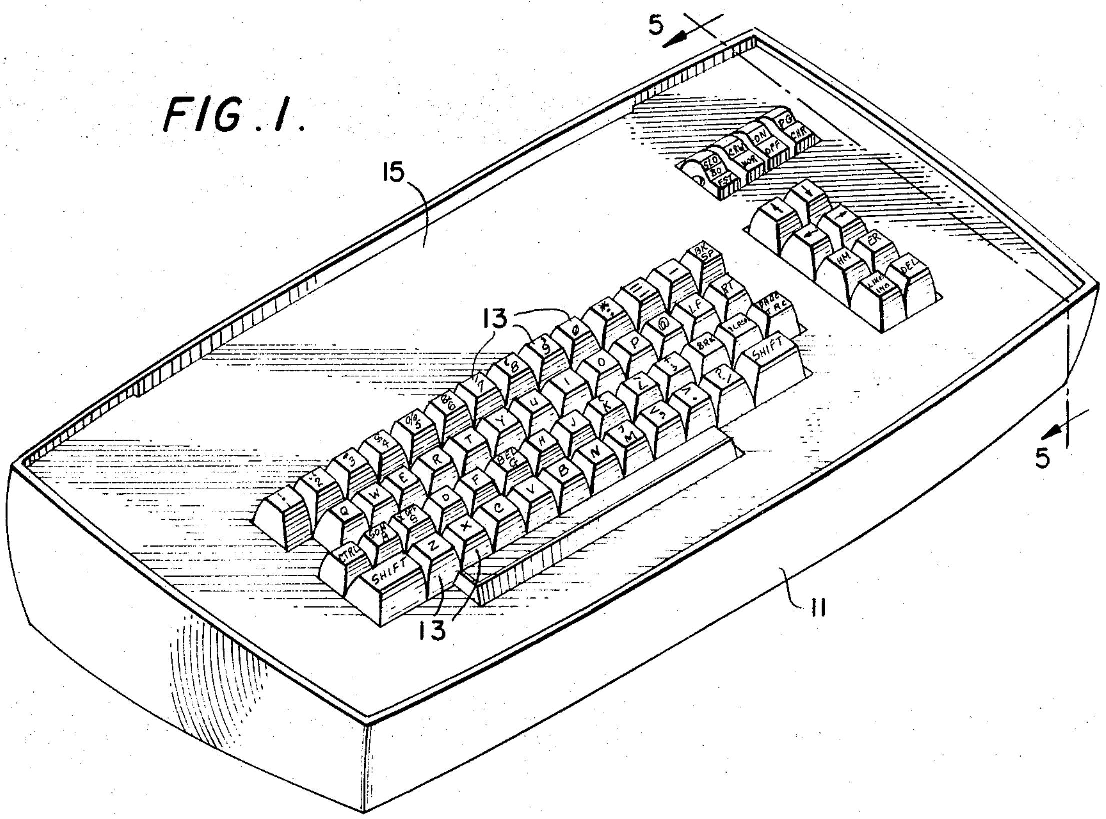
FIG. 1 is a perspective view of the television character generator of the present invention.

As shown in FIG. 1, the television character generator of the present invention is a compact unit not greatly larger than the keyboard of the unit having a convenient and attractive low silhouette. The device as shown in FIG. 1 is a subject of a design patent application Serial No. 129,660 filed March 30, 1971 and invented by the inventor of the present application. The unit comprises a casing 11 which houses the keyboard and circuitry of the unit. The keys of the keyboard, designated by the reference number 13, extend out through a removable top plate 15 closing the top of the casing 11.

Figure 2:
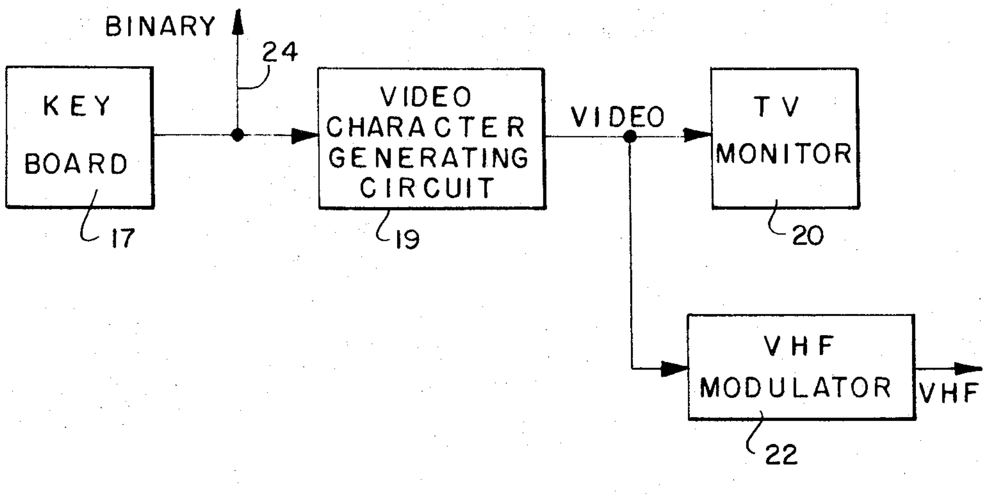
FIG. 2 is a block diagram illustrating the circuitry of the television character generator of the present invention.

The block diagram of FIG. 2 generally illustrates the circuitry of the system of the present invention. As shown in FIG. 2, the keyboard, designated by the reference number 17, generates binary coded signals representing alphanumeric characters in response to actuation of the keys of the keyboard. These signals are applied to the video character generating circuit 19, which in response to the coded signals generates a video signal. This video signal when applied to a television monitor 20 will cause the alphanumeric characters represented by the coded signals produced by the keyboard to be displayed on the screen of the television monitor.

The video signals produced by the circuit 19 are also modulated by a modulator 22 so that they can be readily displayed by a conventional television receiver. The specific details of the video character generating circuit 19 do not form part of this invention and accordingly their circuit is not disclosed in detail. This circuit 19, for example, may be the same as that disclosed in the U.S. Pat. to Botjer, No. 3,413,610. The binary signal generated by the keyboard may also be transmitted directly over channel 24 to a receiver such as a data processing unit.

Figure 4:
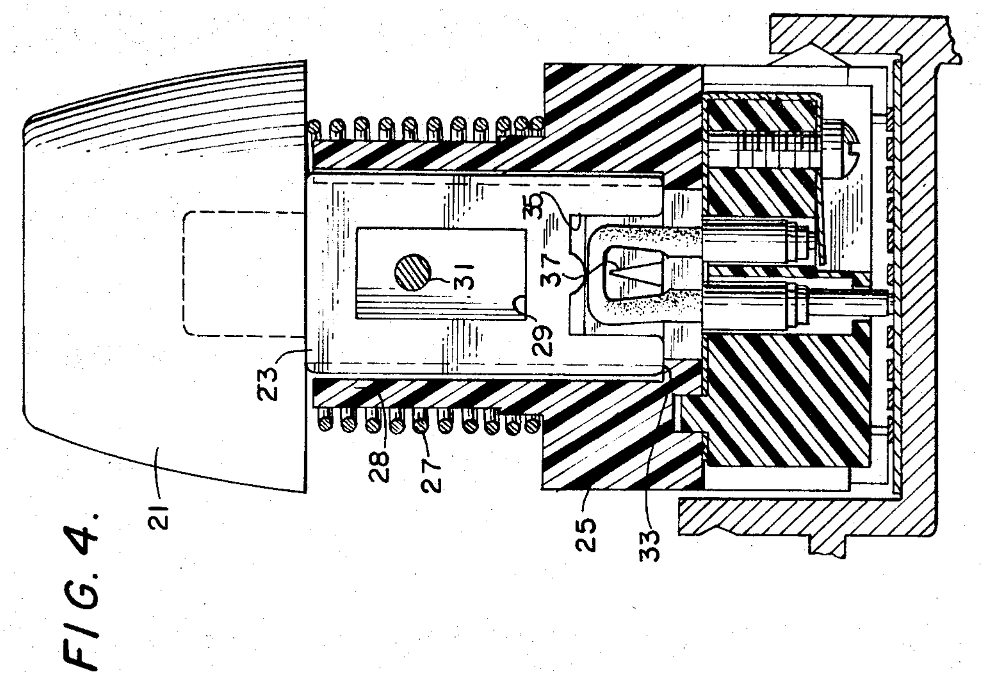
FIG. 4 is an illustration of the key in FIG. 3 showing it in a depressed position.
Figure 3:
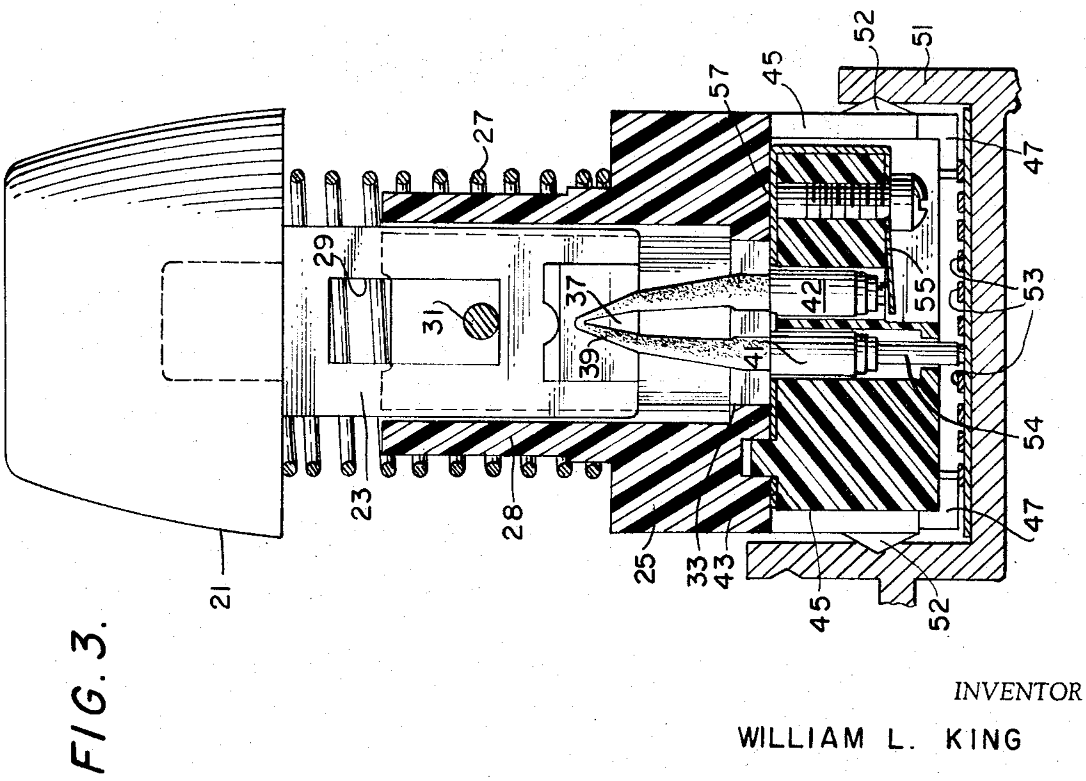
FIG. 3 is a sectional view of one of the keys of the keyboard illustrating the switching mechanism of the key.

The keyboard of the television character generator of the present invention is manufactured by Mechanical Enterprises, Inc. and comprises mercury switches which are closed in response to depression of the keys of the keyboard. FIGS. 3 and 4 illustrate the details of one of the keys of the keyboard and the mercury switch actuated thereby. In FIG. 3 the key is shown in its normal condition and in FIG. 4 the key is shown in its actuated or depressed condition. As shown in FIGS. 3 and 4, the key and switch combination comprises a push button 21 which is mounted on a plunger 23 slidably disposed in a block 25. The push button and plunger are vertically movable with respect to the block 25 between the two positions shown in FIG. 3 and shown in FIG. 4 and are biased to the position shown in FIG. 3 by means of a spring 27, which surrounds the plunger 23 and the upper portion 28 of the block 25, in which the plunger is slidably mounted. The spring extends between the push button 21 and a shoulder of the block 25 urging the push button 21 and thereby the plunger 23 to the position shown in FIG. 3. The plunger 23 has a rectangular opening 29 defined therein and a bar 31 fixed to the block 25 passing through the opening 29. The spring 27 urges the bottom edge of the opening 29 in engagement with the bar 31 to provide the upper limit of travel to the plunger 23 and push button 21 as is illustrated in FIG. 3. When the plunger is depressed to its lower limit of travel, the bottom outer edge of the plunger engages an inner shoulder 33 defined on the mounting block 25. A cavity 35 is defined in the bottom of the plunger 29 and a triangular bar 37 fixed to the block 25 extends across this cavity. Extending over the bar 37 is a flexible tube 39 containing mercury having electrical contacts 41 and 42 at each end thereof. As shown in FIG. 3, the flexible tube 39 is formed in shape of a "U" over the bar 37. When the plunger 29 is in its upper position, the upper edge of the bar 37 stretches the middle of the tube upwardly and separates the mercury in two disconnected pools at each end of the tube 39 thus providing an open switch condition. When the plunger 29 is actuated or depressed as shown in FIG. 4, the tube returns to the unstretched U-shaped configuration as shown in FIG. 4, and the mercury pools at each end of the tube flow into contact with one another providing a closed switch condition between the contacts at each end of the tube 39. The block 25 sits on a second block 43 in which the contacts 41 and 42 are mounted and held in place so that the tube 39 extends up from the block 43 through a cavity in the bottom of the block 25. The block 43 is held in place with respect to the block 25 by means of legs 45 on the block 25 extending along the outside of the block 43 and having feet 47 holding the block 43 and block 25 together. The block 43 and the legs 45 extend into a cup 51 and are held in position in the cup 51 by means of protusions 52 on the legs 45 engaging the walls of the cup. Extending along the bottom of the cup are parallel conducting strips 53. One of these conducting strips 53a is connected to the contact 41 by a conductor 54 passing through the block 43. The bottom of the block 43 is provided with a recess into which extends an arm of a current distributor 55 and connects to the contact 42. The distributor 55 is mounted on the block 43 in contact with the contact 42 by means of a screw 57. The distributor 55 extends around the block and over the top thereof to connect with one or more diodes (not shown), which extend through the block 43 and connect with one or more of the conducting strips 53. Thus when the push button 21 is depressed, electrical connection will be provided between the conducting strip 53a and one or more of the remaining conducting strips 53 through diodes thus providing a coded output representing an alphanumeric character. By placing the diodes at different positions in the block 43 to connect with different ones of the conducting strips different characters may be coded by each key.

Figure 5:
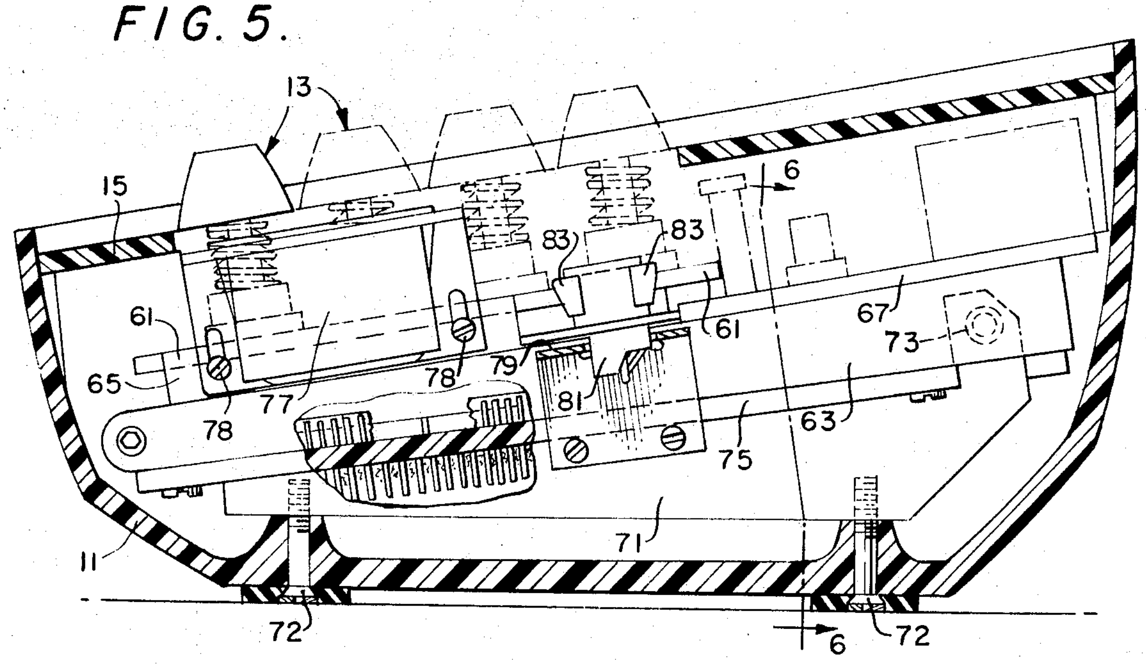
FIG. 5 is a sectional view through the television character generator taken along the lines 5—5 of FIG. 1.

A keyboard made up of a plurality of keys shown as FIGS. 3 and 4 are mounted in the casing 11 on a plate 61 as best shown in FIG. 5. The plate 61 bridges between and is mounted upon parallel bars 63 forming part of a folding frame. The plate 61 is elevated from the bars 63 by means of spacers 65 which position the plate 61 so that the keys 13 of the keyboard extend up through the plate 15 closing the top of the casing 11. A second plate 67 is mounted upon and bridges between the parallel bars 63. The plate 61 is positioned generally at one end of the bars 63 and the plate 67 is positioned generally at the other end of the bars 63. The two plates overlap slightly near the middle of the bars 63. Amplification circuitry and the VHF modulator 22 are mounted on the plate 67.

Figures 6, 7:
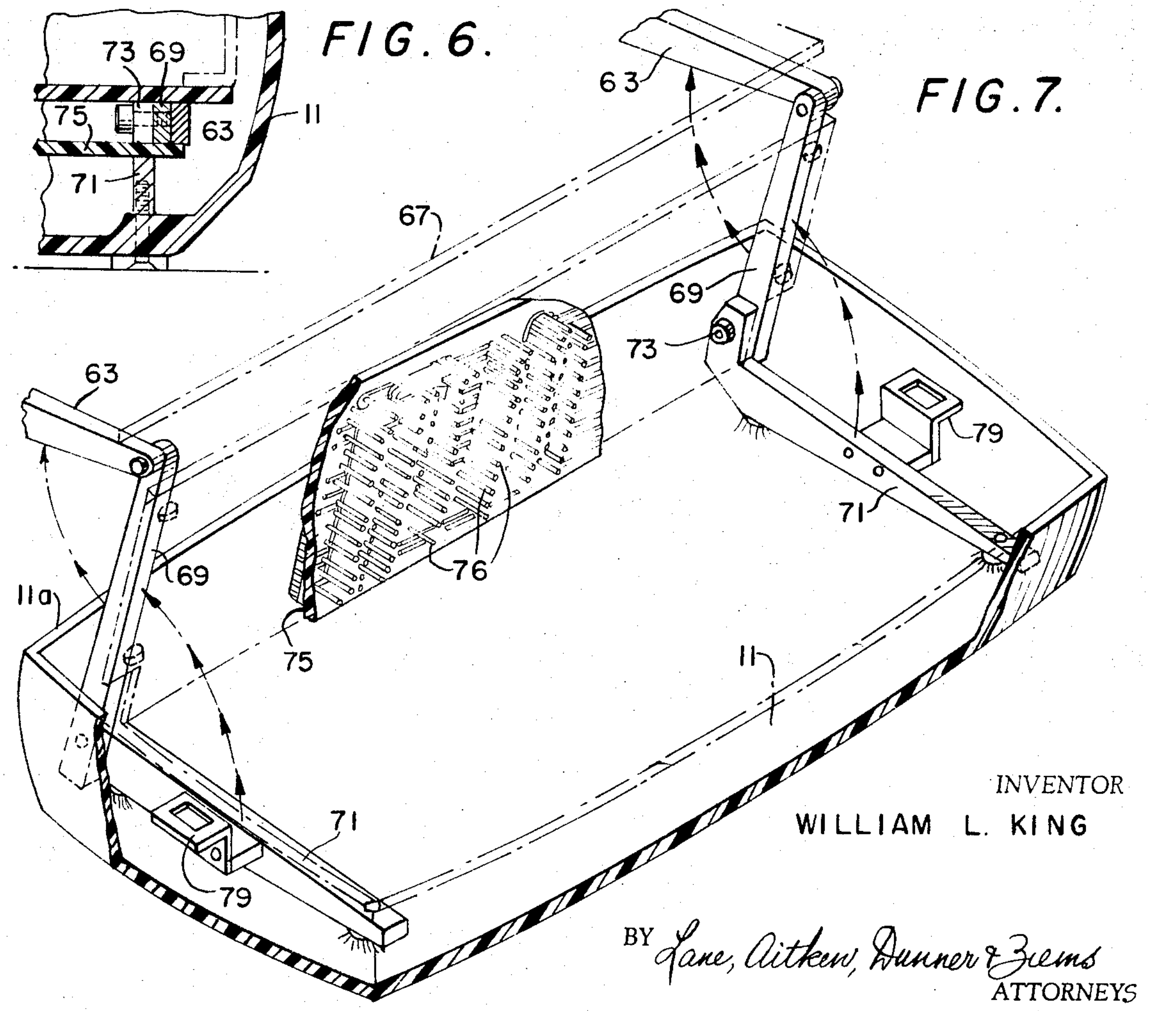
FIG. 6 is a partial sectional view taken along line 6—6 of FIG. 5 showing how the folding frame is supported in the housing of the television character generator.
FIG. 7 is a view in perspective of the television character generator with the top cover removed and with the folding frame partially extended.

As best shown in FIG. 7, the bars 63 are pivotally mounted at their ends to the ends of parallel bars 69, the other ends of which are pivotally mounted on fixed bars 71. The bars 71 are fixed in place in the bottom of the casing 11 by means of screws 72. The bars 63, 69, and 71 comprise the folding frame on which the keyboard and electronics of the character generator of the present invention are mounted. The bars 69 pivot outside the arms 71 and the bars 63 pivot outside the arms 69. The pivotal connection between the bars 69 and 71 is on an upwardly extending foot 73 defined on each of the bars 71. A plate 75 made of insulating material bridges across and is mounted on the bottom of the arms 69. On the top of the plate 75 are mounted the components of the video character generating circuit 19, which is shown as a block in FIG. 2. These circuit components preferably are in the form of integrated circuits. The interconnections between these components are provided beneath the plate 61 by means of conducting pins 76 passing through the plate 75, and wires interconnected between the pins. When the folding frame comprising the bars 63, 69 and 71 are folded up in the position shown in FIG. 5, the plate 75 rests directly on the bars 71 and the bars 63 rest directly on the plate 75 as is best illustrated in FIG. 6. Thus a very compact arrangement is provided with the video character generating circuitry all mounted on a readily accessible plate directly beneath the keyboard resulting in a compact portable unit with a convenient attractive low silhouette.

The upper surface of the bars 71 are canted relative to the bottom surface of the bars 71 and to the bottom of the casing 11. Since the remaining bars have parallel top and bottom surfaces, this cant to the upper surfaces of the bars 71 gives a corresponding cant to the keyboard, which is replicated by the plate 15 closing the top of the casing 11.

As best illustrated in FIG. 5, magnets 77 are mounted by means of screws 78 on each of the spacers 65 between the plate 61 and each of the bars 63. These magnets 77 are positioned to have the poles engage the plate 15 and by magnetic attraction hold the plate 15 in place and closing the top of the casing 11.

A latch is provided to hold each of the bars 63 to the bars 71 when the folding frame is in the folded position shown in FIG. 5. This latch mechanism comprises a latch socket 79 mounted on each of the bars 71 adapted to receive latch mechanism 81 mounted on each of the bars 63. To release the latch mechanism 81 from the socket, the buttons 83 of the mechanism are squezed together.

To gain access to the circuitry of the character generator or to the keyboard, the plate 15 is removed and the folding frame comprising the bars 71, 69, and 63 are extended as shown in FIG. 7 by releasing the latch mechanisms 81 from the sockets 79 and lifting the frame out of the casing 11. When the frame is fully extended, it can be balanced in an extended position without external support by pivoting the bars 69 until they rest against the back wall 11a of the casing and then pivoting the bars 63 clockwise as shown in FIG. 7 until the plate 67 engages the plate 75. The center of gravity of the bars 69 and the portions of the system fixed thereto will then be on the counter-clockwise side of the pivot axis between the bars 69 and the bars 71 as viewed in FIG. 7. The center of gravity of the bars 63 and the portions of the system fixed thereto will be on the clockwise side of the pivot axis between the bars 63 and the bars 69 as viewed in FIG. 5. The center of gravity of the combined pivoted portions will be on the counterclockwise side of the pivot axis between the bars 69 and 71. The pivoted portions will then be balanced in a stable position extending generally vertically out of the casing 11.

Thus there is provided the compact television character generator with a low profile achieved by locating the video character generating circuit beneath a keyboard of the type in which the keys actuate mercury switches. Easy access to the electronic circuitry is provided by means of a unique folding frame on which the keyboard and circuitry is mounted. The above description is of a preferred embodiment of the invention and many modifications may be made thereto without departing from the spirit and scope of the invention, which is defined in the appended claims.

I claim:

1. A television character generator for producing alphanumeric characters on the screen of at least one external television monitor comprising a casing, a first plate mounted in said casing, a keyboard mounted on said first plate in said casing having a plurality of keys including means to generate character signals representing different alphanumeric characters in response to the actuation of each of said keys, video character generating means mounted in said casing responsive to said character signals to generate a video signal which when applied to said television monitor will produce on a screen of said monitior the alphanumeric characters represented by said character signals, a second plate mounted in said casing beneath said first plate generally parallel to said first plate and adjacent to said first plate, said video character generating means being in the form of interconnected integrated circuits mounted on said second plate beneath said keyboard, all television monitors responsive to said video signal being external to and apart from said casing.

2. A television character generator as recited in claim 1, wherein said keyboard includes a plurality of mercury switches, one corresponding to and actuated by each of said keys, and means responsive to the actuation of said mercury switches to generate said character signals.

3. A keyboard responsive apparatus comprising a casing, a first plate mounted in said casing, a second plate mounted in said casing hinged to said first plate on one side and hinged to said casing on the side, a keyboard mounted on said first plate having a plurality of keys including means to generate character signals representing different alphanumeric characters in response to the actuation of said keys, circuitry means responsive to and acting upon said character signals mounted on said second plate, said second plate being beneath said first plate in said casing whereby said first and second plates can be folded out of said casing by pivoting upon the hinged connections between said plates and said casing.

4. A keyboard responsive apparatus as recited in claim 3, wherein said hinged connections between said plates and said casing are constructed so that said plates can be balanced in a stable position extending generally vertically from said frame without external support.

5. A keyboard responsive apparatus as recited in claim 3, wherein said first plate is mounted upon and bridges between a first pair of parallel bars, said second plate is mounted upon and bridges between a second pair of parallel bars pivotally connected at one end of said first pair of bars and pivotally connected at the other end to a third pair of bars fixed to the bottom of said casing, said second plate resting upon said third pair of bars and said first pair of bars resting upon said second plate when said bars and said plates are folded up in said casing.

6. A keyboard responsive apparatus as recited in claim 5, wherein the top surface of said third parallel bars is canted at an angle relative to the bottom of said casing whereby said keyboard is canted at said angle.

7. A television character generator for producing alphanumeric characters on the screen of at least one external television monitor comprising a casing, a first plate mounted in said casing, a keyboard mounted on said first plate in said casing having a plurality of keys including means to generate character signals representing different alphanumeric characters in response to the actuation of each of said keys, a second plate hinged to said first plate on one side and hinged to said casing on the other side, video character generating means mounted on said second plate in said casing beneath said keyboard responsive to said character signals to generate a video signal which when applied to said television monitor will produce on the screen of said monitor the alphanumeric characters represented by said character signals, said second plate being beneath said first plate in said casing whereby said first and second plates can be folded out of said casing by pivoting on the hinge connection between said plates and said casing, all television monitors responsive to said video signals being external to said casing.

8. A television character generator as recited in claim 7, wherein the hinged connections between said plates and said casing are constructed so that said plates can be balanced in a stable unfolded position extending generally vertically from said casing without external support.

9. A television character generator as recited in claim 7, wherein said first plate is mounted upon and bridges between a first pair of parallel bars, said second plate is mounted upon and bridges between a second pair of parallel bars pivotally connected at one end of said first pair of bars and pivotally connected at the other end to a third pair of parallel bars fixed to the bottom of said casing; said second plate resting directly upon said third pair of bars and said first pair of bars resting directly upon said second plate when said bars and said plates are folded up in said casing.

10. A television character generator as recited in claim 9, wherein the top surface of said third parallel bars is canted at an angle with respect to the bottom of said casing, whereby said keyboard is canted at that said same angle.

* * * * *